United States Patent
Henrion et al.

(10) Patent No.: US 10,837,823 B2
(45) Date of Patent: Nov. 17, 2020

(54) AIRCRAFT LANDING GEAR

(71) Applicant: SAFRAN LANDING SYSTEMS, Velizy Villacoublay (FR)

(72) Inventors: Philippe Henrion, Velizy Villacoublay (FR); Olivier Collet, Velizy Villacoublay (FR)

(73) Assignee: SAFRAN LANDING SYSTEMS, Velizy Villacoubl (FR)

(*) Notice: Subject to any disclaimer, the term of this patent is extended or adjusted under 35 U.S.C. 154(b) by 352 days.

(21) Appl. No.: 15/887,859

(22) Filed: Feb. 2, 2018

(65) Prior Publication Data

US 2018/0224321 A1    Aug. 9, 2018

(30) Foreign Application Priority Data

Feb. 3, 2017  (FR) ..................... 17 50944

(51) Int. Cl.

| | |
|---|---|
| *G01G 19/12* | (2006.01) |
| *G01B 7/24* | (2006.01) |
| *B64C 25/00* | (2006.01) |
| *B64D 45/00* | (2006.01) |
| *B64C 25/36* | (2006.01) |
| *G01G 3/15* | (2006.01) |

(Continued)

(52) U.S. Cl.
CPC ........... *G01G 19/12* (2013.01); *B64C 25/001* (2013.01); *B64C 25/36* (2013.01); *B64D 45/00* (2013.01); *G01B 7/24* (2013.01); *G01G 3/15* (2013.01); *G01G 7/02* (2013.01); *G01G 19/07* (2013.01); *G01M 1/125* (2013.01)

(58) Field of Classification Search
CPC . B64C 2025/003; B64C 25/001; B64C 25/36; G01G 19/12; G01G 3/15; G01G 7/02; G01G 19/07; B64D 45/00; G01B 7/24; G01M 1/125
USPC ........................................................ 73/779
See application file for complete search history.

(56) References Cited

U.S. PATENT DOCUMENTS

| | | |
|---|---|---|
| 2,615,330 A | 10/1952 | Blackmon et al. |
| 3,494,181 A | 2/1970 | Boelkins et al. |

(Continued)

FOREIGN PATENT DOCUMENTS

| | | |
|---|---|---|
| EP | 0 026 446 A2 | 4/1981 |
| EP | 0 232 535 A2 | 8/1987 |

(Continued)

OTHER PUBLICATIONS

Preliminary Search Report and Written Opinion dated Oct. 17, 2017, for French Application No. 1750944, filed Feb. 3, 2017, 6 pages.

*Primary Examiner* — Octavia Hollington
(74) *Attorney, Agent, or Firm* — Christensen O'Connor Johnson Kindness PLLC

(57) ABSTRACT

An aircraft undercarriage has an axle for carrying at least one wheel. The undercarriage further includes a magnetic measurement target and at least one magnetic movement sensor cooperating with the magnetic measurement target to measure bending of the axle. The magnetic measurement target has a body that extends inside the axle and includes a fastener end fastened to one end of the axle. The body also include a target surface that extends over an inside surface of the body. The magnetic movement sensor is positioned inside the axle to measure movement of the target surface.

12 Claims, 4 Drawing Sheets

(51) Int. Cl.
*G01G 7/02* (2006.01)
*G01G 19/07* (2006.01)
*G01M 1/12* (2006.01)

(56) References Cited

U.S. PATENT DOCUMENTS

| | | | | |
|---|---|---|---|---|
| 4,269,070 | A | * 5/1981 | Nelson | G01B 7/24 |
| | | | | 336/130 |
| 4,651,402 | A | * 3/1987 | Bonfils | B23P 11/00 |
| | | | | 29/446 |
| 4,782,706 | A | 11/1988 | Kister et al. | |
| 5,205,514 | A | * 4/1993 | Patzig | G01G 19/07 |
| | | | | 177/136 |
| 7,484,424 | B2 | * 2/2009 | Pradier | G01G 19/07 |
| | | | | 73/802 |
| 2013/0192903 | A1 | 8/2013 | Dubois | |
| 2018/0372535 | A1 | * 12/2018 | Bailly | G01G 19/07 |

FOREIGN PATENT DOCUMENTS

| | | | |
|---|---|---|---|
| FR | 2 471 593 A1 | | 6/1981 |
| FR | 2471593 | * | 6/1981 |

* cited by examiner

AIRCRAFT LANDING GEAR

BACKGROUND

The present disclosure relates to the field of aircraft landing gear.

Several methods have been proposed for use at the moment of landing to determine in a reliable manner whether the wheels carried by an undercarriage of an aircraft have or have not touched the ground.

In particular, proposals have been made to measure the pressure of a shock absorber in a leg of the undercarriage, or indeed to measure movement of a sliding rod in the leg of the undercarriage. Nevertheless, the shock absorber of an undercarriage leg presents a movement threshold and a contraction threshold that make those solutions ineffective and inappropriate.

Proposals have also been made to integrate movement sensors inside a wheel-carrying axle of the undercarriage, and in particular magnetic movement sensors of the linear variable differential transformer (LVDT) type. The LVDT sensors are positioned on an inside diameter of the axle.

Nevertheless, the space available inside the axle is very small, so it is appropriate to use LVDT sensors of very small size, which are fragile, not very accurate, and expensive. Furthermore, LVDT sensors are difficult to install and remove, once more because of the small size of the axle. Finally, the little space that is available makes it necessary to place LVDT sensors on a common support. Any one of the LVDT sensors jamming thus leads to losing the information produced by the other LVDT sensors.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In order to achieve this object, the invention provides an aircraft undercarriage including an axle for carrying at least one wheel, the aircraft undercarriage further including a magnetic measurement target and at least one magnetic movement sensor co-operating with the magnetic measurement target to measure bending of the axle, the magnetic measurement target comprising a body that extends inside the axle, the body including a fastener end fastened to one end of the axle and a target surface that extends over an inside surface of the body, the magnetic movement sensor being positioned inside the axle to measure movement of the target surface.

The positioning of the magnetic measurement target inside the axle serves to increase the space available for integrating the magnetic movement sensor that co-operates with the magnetic measurement target.

This integration also serves to facilitate maintenance operations performed on the magnetic measurement target and on the magnetic movement sensor.

Finally, when a plurality of magnetic movement sensors are used, the increase in available space enables the magnetic movement sensors to be positioned on different supports, thereby increasing the reliability of the measurement.

The invention can be better understood in the light of the following description of a particular, non-limiting embodiment of the invention.

DESCRIPTION OF THE DRAWINGS

Reference is made to the accompanying drawings, in which.

DETAILED DESCRIPTION

Figure 1:
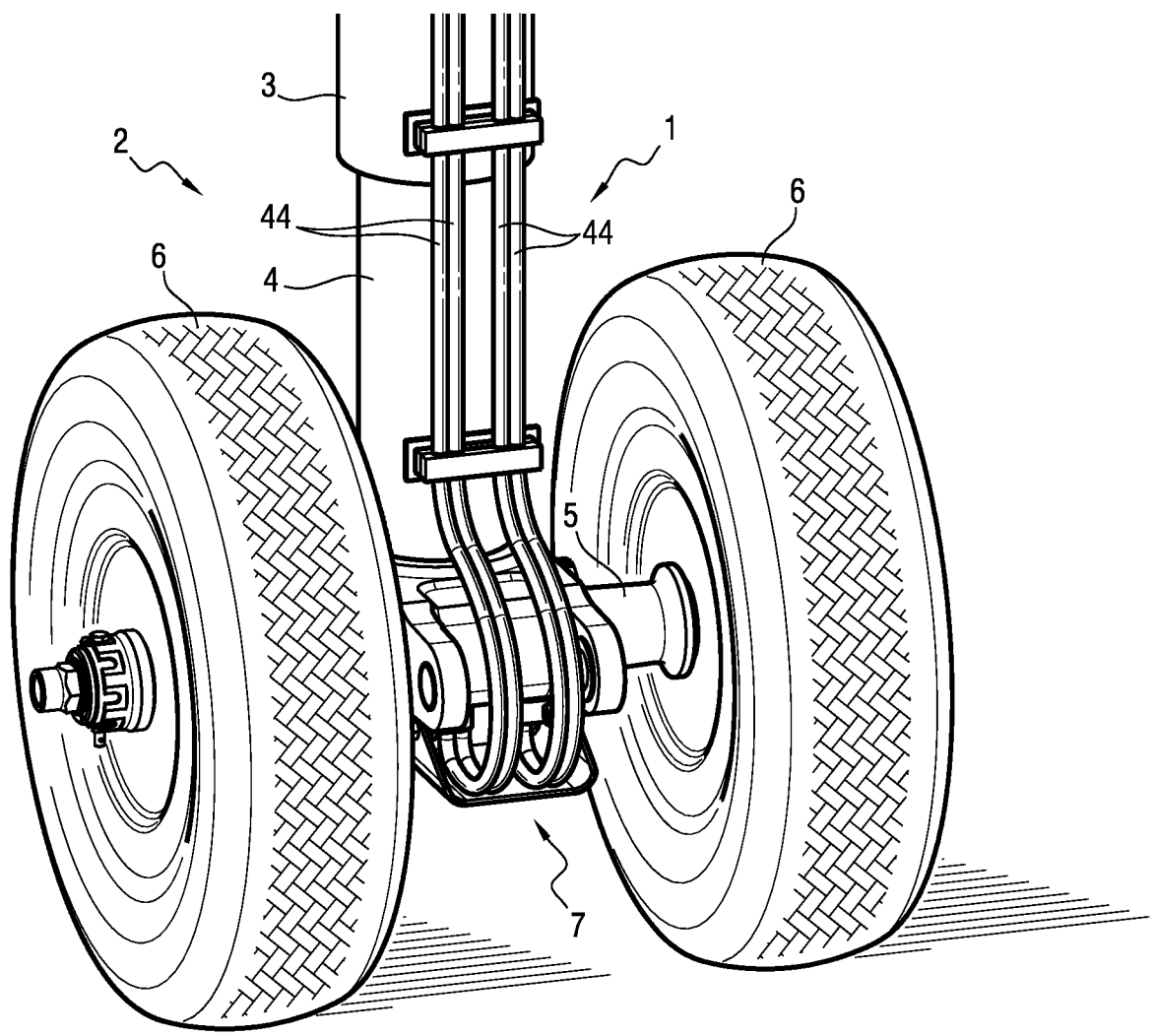
FIG. 1 shows a leg of an aircraft undercarriage of the invention.

With reference to FIG. 1, an aircraft undercarriage 1 of the invention comprises nose gear having a leg 2 with a strut 3 in which a slidable rod 4 slides.

An axle 5 carrying two wheels 6 is positioned at the bottom of the slidable rod 4.

In this example, two magnetic measurement targets are used together with magnetic movement sensors for detecting deformation of the axle 5 at the moment of landing so as to determine in reliable manner whether or not the wheels 6 have touched the ground.

Figure 2:
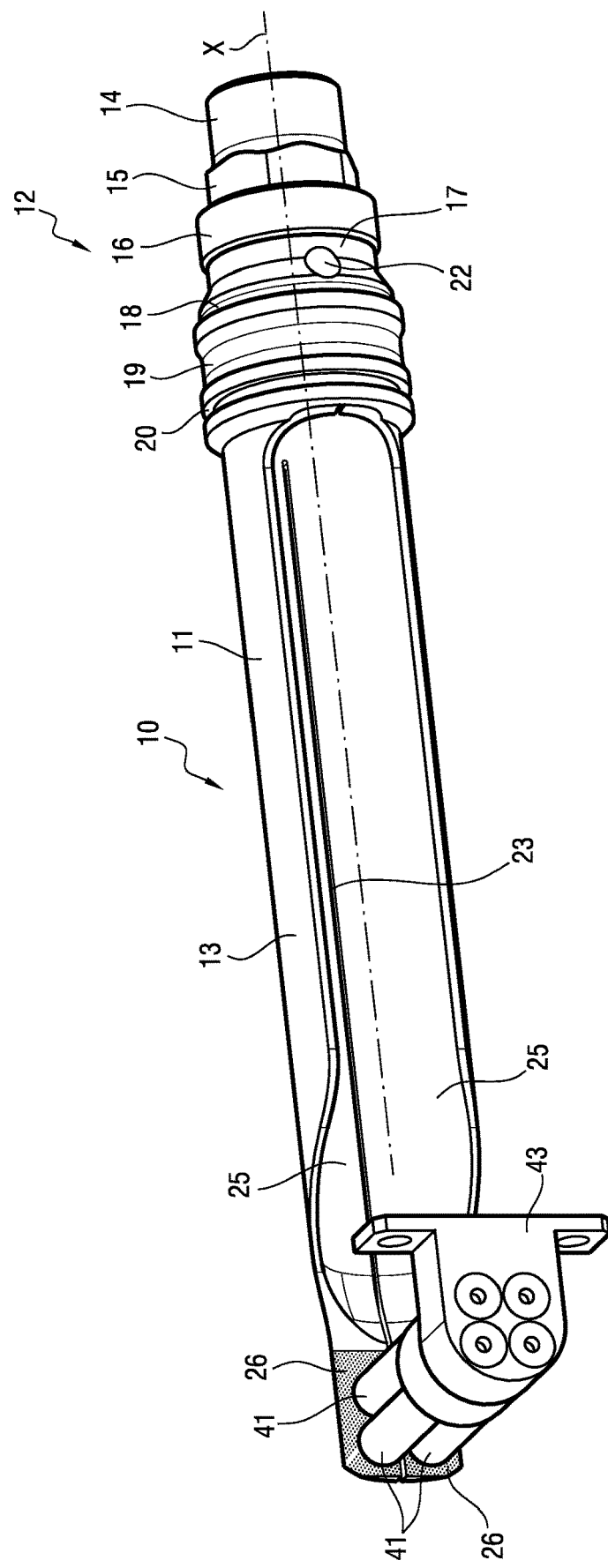
FIG. 2 shows a magnetic measurement target and LVDT sensors co-operating with the magnetic measurement target.

With reference to FIG. 2, the magnetic measurement target 10 comprises a body 11 that includes a fastener end 12 and a main portion 13.

The fastener end 12 presents in succession along the length of the body 11: a cylindrical outer surface portion 14; a hexagonal outer surface portion 15; a threaded portion 16; a first groove 17; an outer chamfer 18; a second groove 19; and a third groove 20 of square section. A sealing gasket (not shown in the figures) is positioned in the third groove 20. A through orifice 22 is situated in the first groove 17.

The main portion 13 of the body 11 presents the shape of a portion of a hollow cylinder about an axis X.

A slot 23 is formed in the main portion 13 of the body 11. The slot 23 extends in an axial direction, parallel to the axis X, over nearly the entire length of the main portion 13.

The slot 23 separates two longitudinal body portions 25. Each longitudinal body portion 25 presents a plane target surface 26 at a free end, which target surface extends over an inside surface of the longitudinal body portion 25, i.e. facing the axis X.

The two target surfaces 26 are thus separated solely by the slot 23. The portion of a hollow cylindrical shape of the main portion 13 is such that no material (of the body 11) extends facing the target surfaces 26.

Figure 3:
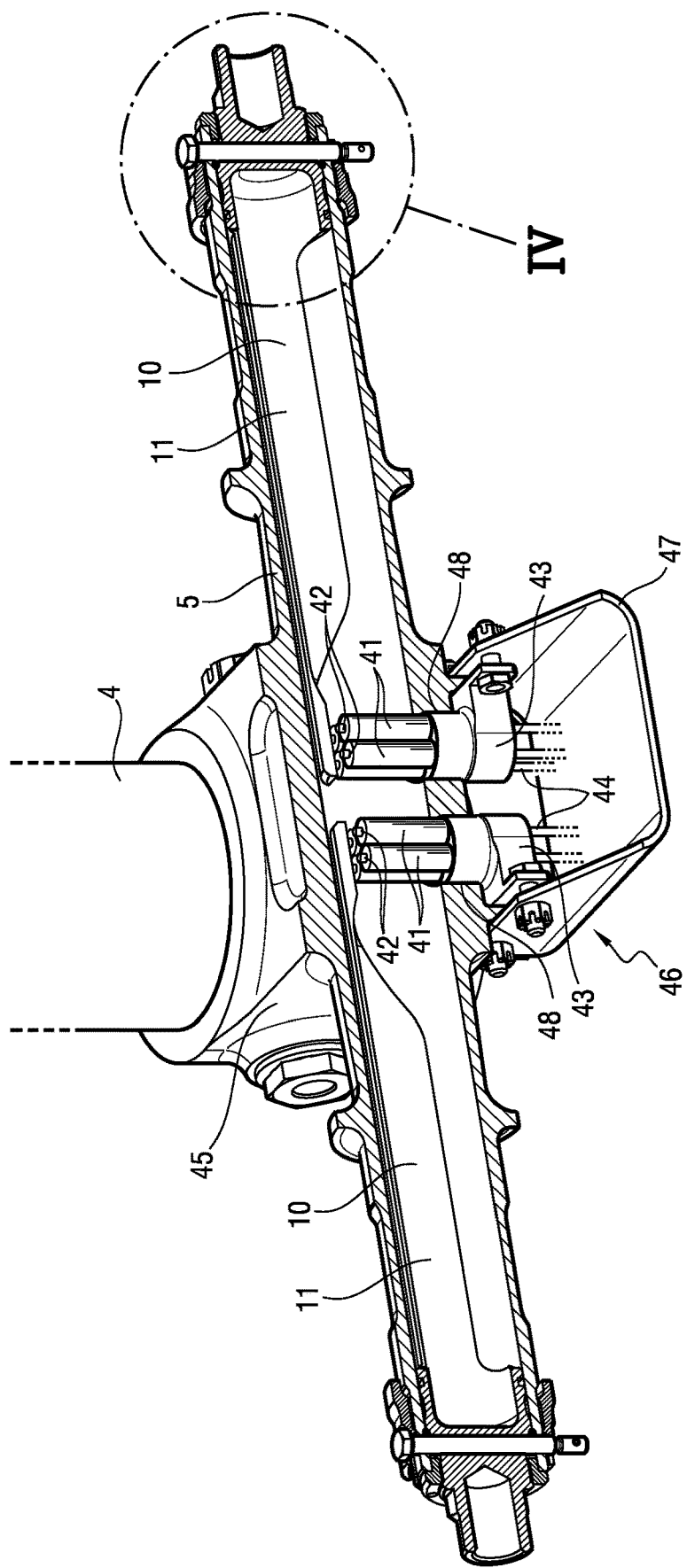
FIG. 3 shows two magnetic measurement targets and LVDT sensors integrated in an axle of the aircraft undercarriage of the invention.
Figure 4:
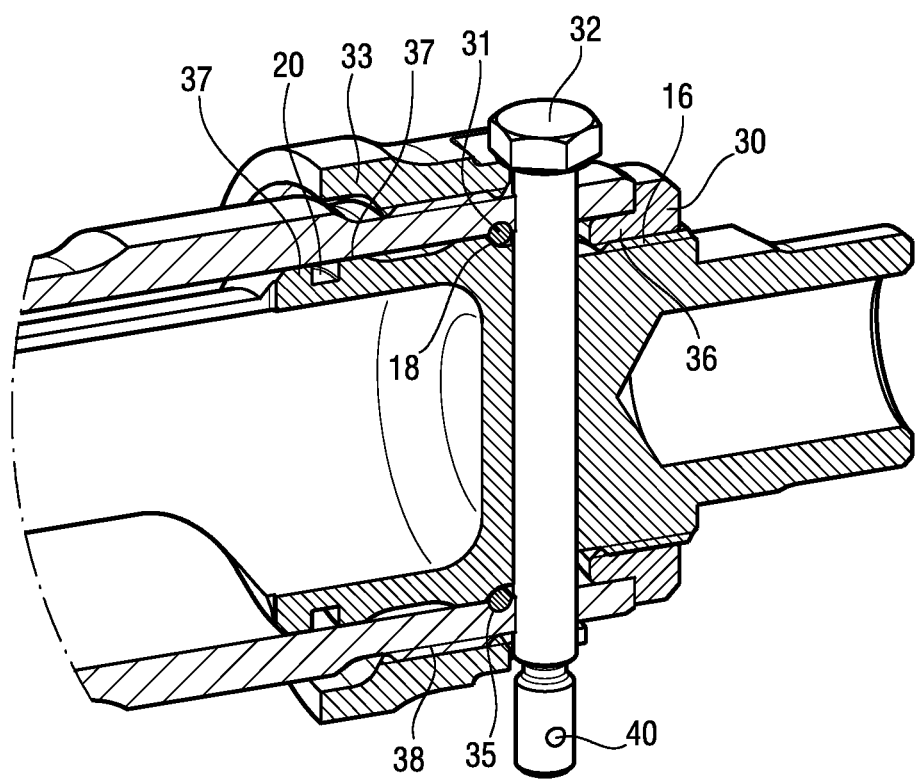
FIG. 4 is an enlargement of FIG. 3 at an end of the axle.

With reference to FIGS. 3 and 4, two magnetic measurement targets 10 are integrated in the axle 5, each magnetic measurement target 10 being positioned in a respective half of the axle 5.

Installing each of the magnetic measurement targets 10 requires fastener means that are constituted by a nut 30 and a ring 31.

The body 11 of the measurement target 10 is inserted inside the axle 5, to a little way beyond its final position. The ring 31 is then positioned against the outer chamfer 18. Thereafter, the body 11 is backed outwards from the axle 5 in order to be positioned in its final position.

The ring 31 then becomes positioned in part in a groove 35 provided for this purpose in an inside surface of the axle 5. When the body 11 backs outwards from the axle 5, the outer chamfer 18 bears against the ring 31 so as to increase the diameter of the ring 31, which engages further into the groove 35.

The nut 30 is then tightened on the threaded portion 16 of the body 11. A portion 36 of the nut 30 is inserted inside the axle 5. The more the nut 30 is tightened, the harder the ring 31 engages in the groove 35.

The ring 31 and the groove 35 form an axial abutment for the body 11 of the magnetic measurement target 10.

The outside diameter of the nut 30 in its portion 36 is very close to the inside diameter of the axle 5 at its end, such that first short centering of the magnetic measurement target 10 inside the axle 5 is obtained by means of the nut 30, the body 11, and the axle 5.

The sealing gasket and the body surfaces 37 situated on either side of the third groove 20 also present an outside diameter that is very close to the inside diameter of the axle 5 at this location, such that second short centering of the magnetic measurement target 10 inside the axle 5 is obtained via the sealing gasket, the body surfaces 37, and the axle 5.

A wheel nut 33 is screwed onto a threaded portion 38 of an outside surface of the axle 5. A bolt 32 for preventing the wheel nut 33 from turning is inserted through a through orifice in the wheel nut 33 and through a through orifice in the axle 5, and through the through orifice 22 situated in the first groove 17 of the body 11.

At one of its ends, the nut 32 presents a radial through orifice 40 suitable for passing a lockwire.

The lockwire could be replaced by a split pin for locking a nut (not shown in the figures).

The nut 30, the ring 31, the groove 35 formed in the inside surface of the axle 5, and the fastener end 12 of the body 11 thus form means for securing the body 11, and thus the magnetic measurement target 10, to the axle 5 without backlash.

Thus, for each magnetic measurement target 10, the backlash-free connection between the axle 5 and the magnetic measurement target 10 that results from these backlash-free securing means serves to produce movement of the target surfaces 26 that is representative of a movement of the end of the axle 5 to which the body 11 of the magnetic measurement target 10 is fastened. In particular, bending of the axle 5 leads to movement in rotation of the measurement target 10 and thus of the target surfaces 26.

The movement of the target surfaces 26 is amplified compared with the movement at the end of the axle 5 to which the body 11 is fastened as a result of the distance between the target surfaces 26 and the end of the axle (and thus because of the length of the main portion 13 of the body 11).

Each magnetic measurement target 10 is included in a magnetic measurement device that, in addition to the magnetic measurement target 10, includes at least two magnetic movement sensors, specifically a set of four magnetic movement sensors.

The magnetic movement sensors used in this example are LVDT sensors 41.

In each magnetic measurement device, the magnetic measurement target is thus associated with a set of LVDT sensors 41.

In each magnetic measurement device, the four LVDT sensors 41 include two LVDT sensors 41 for co-operating with one of the two target surfaces 26 and two LVDT sensors 41 for co-operating with the other one of the two target surfaces 26.

Each LVDT sensor 41 has a measurement end including a feeler 42 that is in contact with one of the target surfaces 26 when the magnetic measurement target 10 and thus said target surface 26 is caused to move in rotation. Bending of the axle 5 that results from the wheel 6 contacting the ground is thus detected.

Each set of four LVDT sensors 41 associated with a magnetic measurement target 10 (two LVDT sensors 41 per target surface 26 of the magnetic measurement target 10) is mounted on a sensor support 43. Wires 44 connected to the LVDT sensors 41 run from each sensor support 43 for the purpose of transmitting the measurements produced by the LVDT sensors 41 to a computer or to a data concentrator.

The axle 5 includes a yoke, constituting a central portion 45 of the axle 5 that is fastened to the slidable rod 4 at a bottom end 46 of the slidable rod 4. The central portion 45 of the axle 5 has two bottom openings 48 giving access to the inside of the axle 5.

Each sensor support 43 is fastened to the central portion 45 and extends through one of the bottom openings 48. The LVDT sensors are thus inserted inside the central portion 45 of the axle 5. The LVDT sensors 41 thus extend inside the central portion 45 of the axle 5 and they are positioned in such a manner that the measurement ends of the LVDT sensors 41 are situated in the immediate proximity of or indeed in contact with the target surfaces 26, in order to measure movement of the target surfaces 26.

A cover 47 protects the LVDT sensors 41.

This configuration makes it very easy to install, to remove, and to replace the LVDT sensors 41, since in order to access the LVDT sensors 41 it suffices to remove the cover 47. There is thus no need to have access to the inside of the axle 5. The maintenance operations that are performed on the magnetic measurement devices (each comprising a magnetic measurement target 10 and a set of LVDT sensors 41) are thus facilitated.

This configuration also makes it possible to handle the magnetic measurement target 10 and the LVDT sensors 41 (or more precisely in this example the sets of four LVDT sensors 41) as line-replaceable units (LRUs), i.e. independent pieces of equipment that can be monitored, replaced, and/or stored individually. This serves once more to facilitate maintenance operations that are performed on the magnetic measurement devices.

Naturally, the invention is not limited to the embodiment described but covers any variant coming within the ambit of the invention as defined by the claims.

The invention naturally applies to any type of landing gear (nose gear, main landing gear), and in particular to undercarriages carrying some number of wheels other than two (e.g. an undercarriage carrying only one wheel).

There follows a description of how the four magnetic movement sensors per magnetic measurement target are used. It is possible to use some other number of magnetic movement sensors, and in particular it is possible to use a single magnetic movement sensor per target surface.

The magnetic movement sensors are not necessarily LVDT sensors. Any type of sensor could be used (e.g. Hall effect sensors).

Although it is stated herein that the LVDT sensors serve "only" to detect whether or not the wheels have touched the ground, the magnetic movement sensors naturally also make it possible to measure accurately the amplitude of the movements to which the target surfaces and the axle have been subjected.

It is stated that the magnetic measurement device comprising the magnetic measurement target and the LVDT sensors is used to detect whether or not the wheels have touched the ground. The magnetic measurement device could also be used to perform other functions, e.g. a health monitoring function (which may also be referred to as a conditional maintenance function or a predictive maintenance function), or a weight and balance function (for evaluating the weight and the center of gravity of the aircraft), or indeed a function of measuring a braking force by measuring bending or twisting of the axle.

While illustrative embodiments have been illustrated and described, it will be appreciated that various changes can be made therein without departing from the spirit and scope of the invention.

The embodiments of the invention in which an exclusive property or privilege is claimed are defined as follows:

1. An aircraft undercarriage, comprising:
   an axle configured to carry at least one wheel; and
   a magnetic measurement target; and
   at least one magnetic movement sensor cooperating with the magnetic measurement target to measure bending of the axle, wherein the magnetic measurement target includes a body that extends inside the axle, the body including a fastener end fastened to one end of the axle and a target surface that extends over an inside surface of the body, the magnetic movement sensor being positioned inside the axle to measure movement of the target surface.

2. The aircraft undercarriage according to claim 1, wherein the magnetic movement sensor is positioned inside a central portion of the axle.

3. The aircraft undercarriage according to claim 2, wherein the magnetic movement sensor is mounted on a support fastened to the central portion of the axle, the support extending through an opening formed in the central portion of the axle.

4. The aircraft undercarriage according to claim 1, wherein the body has a main portion in the form of a portion of a hollow cylinder.

5. The aircraft undercarriage according to claim 1, wherein a slot is formed in the body in an axial direction, the slot separating two longitudinal portions of the body, each longitudinal portion of the body presenting a target surface that extends over an inside surface of the longitudinal portion of the body.

6. The aircraft undercarriage according to claim 5, further comprising two magnetic movement sensors, each magnetic movement sensor being positioned inside the axle and being configured to measure movement of one of the two target surfaces.

7. The aircraft undercarriage according to claim 1, wherein the magnetic movement sensor is a Linear Variable Differential Transformer sensor.

8. The aircraft undercarriage according to claim 7, wherein the Linear Variable Differential Transformer sensor includes a feeler configured to contact the target surface.

9. The aircraft undercarriage according to claim 1, further comprising a securement assembly configured to secure the fastener end of the body of the magnetic measurement target to the end of the axle without backlash.

10. The aircraft undercarriage according to claim 9, wherein the securement assembly comprises a nut screwed onto the fastener end of the body and inserted in part inside the axle.

11. The aircraft undercarriage according to claim 9, wherein the securement assembly includes a ring mounted around the fastener end of the body and positioned in part in a groove formed in an inside surface of the axle.

12. The aircraft undercarriage according to claim 1, further comprising:
   two magnetic measurement targets, each magnetic measurement target being positioned in a respective half of the axle; and
   a plurality of magnetic movement sensors, each magnetic movement sensor cooperating with the two magnetic measurement targets.

* * * * *

UNITED STATES PATENT AND TRADEMARK OFFICE
CERTIFICATE OF CORRECTION

PATENT NO. : 10,837,823 B2
APPLICATION NO. : 15/887859
DATED : November 17, 2020
INVENTOR(S) : P. Henrion et al.

Page 1 of 1

It is certified that error appears in the above-identified patent and that said Letters Patent is hereby corrected as shown below:

On the Title Page

Abstract   Line 8   change "include a" to -- includes a --

Signed and Sealed this
First Day of February, 2022

Drew Hirshfeld
*Performing the Functions and Duties of the*
*Under Secretary of Commerce for Intellectual Property and*
*Director of the United States Patent and Trademark Office*

UNITED STATES PATENT AND TRADEMARK OFFICE
CERTIFICATE OF CORRECTION

| | | |
|---|---|---|
| PATENT NO. | : 10,837,823 B2 | Page 1 of 1 |
| APPLICATION NO. | : 15/887859 | |
| DATED | : November 17, 2020 | |
| INVENTOR(S) | : Henrion et al. | |

It is certified that error appears in the above-identified patent and that said Letters Patent is hereby corrected as shown below:

On the Title Page

Item (73), Line 2, "Villacoubl" should read --Villacoublay--

Signed and Sealed this
Twenty-second Day of August, 2023

Katherine Kelly Vidal
*Director of the United States Patent and Trademark Office*